US010767274B2

(12) United States Patent
Gaydos et al.

(10) Patent No.: US 10,767,274 B2
(45) Date of Patent: Sep. 8, 2020

(54) COMPOSITIONALLY MODULATED ZINC-IRON MULTILAYERED COATINGS

(71) Applicant: THE BOEING COMPANY, Chicago, IL (US)

(72) Inventors: Stephen P. Gaydos, St. Louis, MO (US); Vijaykumar S. Ijeri, Bangalore (IN); Om Prakash, Bangalore (IN); Trilochan Mishra, Jamshedpur (IN); Raghuvir Singh, Jamshedpur (IN); Shashi Kant Tiwari, Jamshedpur (IN)

(73) Assignee: THE BOEING COMPANY, Chicago, IL (US)

( * ) Notice: Subject to any disclaimer, the term of this patent is extended or adjusted under 35 U.S.C. 154(b) by 208 days.

(21) Appl. No.: 15/680,326

(22) Filed: Aug. 18, 2017

(65) Prior Publication Data

US 2018/0355497 A1 Dec. 13, 2018

(30) Foreign Application Priority Data

Jun. 9, 2017 (IN) ............................. 201711020237

(51) Int. Cl.
*C25D 3/56* (2006.01)
*C25D 3/24* (2006.01)
(Continued)

(52) U.S. Cl.
CPC .............. *C25D 3/24* (2013.01); *B22F 3/1055* (2013.01); *C25D 3/54* (2013.01); *C25D 3/562* (2013.01);
(Continued)

(58) Field of Classification Search
CPC ........... C25D 3/56; C25D 3/565; C25D 3/562
(Continued)

(56) References Cited

U.S. PATENT DOCUMENTS

2009/0130425 A1 * 5/2009 Whitaker ............... A63B 49/10 428/312.8

FOREIGN PATENT DOCUMENTS

CN 103451663 A 12/2013

OTHER PUBLICATIONS

Bhat et al., Development of Layered Zn—Fe Coatings for Better Corrosion Protection, Journal of Metals, Materials and Minerals (2010), vol. 20, No. 2, pp. 43-51. (Year: 2010).*

(Continued)

*Primary Examiner* — Edna Wong
(74) *Attorney, Agent, or Firm* — Patterson + Sheridan, LLP

(57) ABSTRACT

The present disclosure provides electrolyte solutions for electrodeposition of zinc-iron alloys, methods of forming electrolyte solutions, and methods of electrodepositing zinc-iron alloys. An electrolyte solution for electroplating can include an alkali metal citrate, an alkali metal acetate, a citric acid, and glycine with a metal salt. An electrolyte solution can be formed by dissolving an alkali metal citrate, an alkali metal acetate, a citric acid, and glycine in water or an aqueous solution. Electrodepositing zinc-iron alloys on a substrate can include introducing a cathode and an anode into an electrolyte solution comprising an alkali metal citrate, an alkali metal acetate, a citric acid, and glycine. Electrodepositing can further include passing a current between the cathode and the anode through the electrolyte solution to deposit zinc and iron onto the cathode.

29 Claims, 6 Drawing Sheets

100

DISSOLVING AN ALKALI METAL CITRATE 102

DISSOLVING AN ALKALI METAL ACETATE 104

DISSOLVING CITRIC ACID 106

DISSOLVING GLYCINE 108

DISSOLVING THIAMINE HYDROCHLORIDE 110

DISSOLVING AN IRON SALT 112

DISSOLVING A ZINC SALT 114

ADJUSTING THE PH OF AN ELECTROLYTE SOLUTION 116

(51) Int. Cl.
*C25D 5/12* (2006.01)
*C25D 3/54* (2006.01)
*C25D 5/18* (2006.01)
*B22F 3/105* (2006.01)
*C25D 5/10* (2006.01)

(52) U.S. Cl.
CPC .............. *C25D 3/565* (2013.01); *C25D 5/10* (2013.01); *C25D 5/12* (2013.01); *C25D 5/18* (2013.01)

(58) Field of Classification Search
USPC ................................................. 205/238, 245
See application file for complete search history.

(56) References Cited

OTHER PUBLICATIONS

Yang et al., “A Sulphate Bath for the Preparation of Zn—Fe Alloy Coatings,” Trans IMF (2002), vol. 80, No. 5, pp. 161-163. (Year: 2002).*

Karahan, “Effects of pH Value of the Electrolyte and Glycine Additive on Formation and Properties of Electrodeposited Zn—Fe Coatings,” The Scientific World Journal (2013), vol. 2013, Article ID 273953, pp. 1-7. (Year: 2013).*

Thangaraj et al., “Surface Modification by Compositionally Modulated Multilayered Zn—Fe Alloy Coatings,” Chinese Journal of Chemistry (2008), vol. 26, pp. 2285-2291. (Year: 2008).*

Nayana et al, Influence of Additive on Nanocrystalline, Bright Zn—Fe Alloy; Electrodeposition and Its Properties, Surface & Coatings Technology 235 (2013) pp. 461-468.

Bhat et al, Development of Layered Zn—Fe Coatings for Better Corrosion Protection, Journal of Metals, Materials and Minerals, (2010) vol. 20 No. 2, 2010 pp. 43-51.

Jensen et al, The Practical Realisation of Zinc-iron CMA Coatings, Surface and Coatings Technology 105 (1998) pp. 240-250.

Bhat and A C Hegde R S: “Production of layer by layer Zn—Fe compositional multilayer alloy coatings using triangular current pulses for better corrosion protection”, Transactions of the IMF, Maney, vol. 93, No. 3, May 1, 2015 (May 1, 2015), pp. 157-163, XP001595710, DOI: h t t p://DX.DOI.ORG/10.1179/002O296715Z.O00000000236 * Last paragraph; p. 158; figure 1; table 1 * * Experimental * * Compositional multilayer coating—Development of CMA Zn—Fe coating *.

V. Thangaraj et al: “Surface Modification by Compositionally Modulated Multilayered Zn—Fe Alloy Coatings”, Chinese Journal of Chemistry, vol. 26, No. 12, Dec. 1, 2008 (Dec. 1, 2008), pp. 2285-2291, XP055501864, CNISSN: 1001-6O4X, DOI: 10.1002/cjoc.200890405 * abstract * * Experimental *.

Ramesh Bhat et al: “Optimization of deposition conditions for bright Zn—Fe coatings and its characterization”, Protection of Metals and Physical Chemistry of Surfaces, SP Maik Nauka/Interperiodica, Dordrecht, vol. 47, No. 5, Sep. 17, 2011 (Sep. 17, 2011), pp. 645-653, XP019954187, ISSN: 2070-206X, DOI:10.1134/S2070205111O5OO3O * abstract; tables 1, 2 ** Last paragraph;p. 646 *.

Extended Eurpoean Search Report for Application No. 18176707.0-1103 dated Jun. 9, 2018.

* cited by examiner

COMPOSITIONALLY MODULATED ZINC-IRON MULTILAYERED COATINGS

CROSS-REFERENCE TO RELATED APPLICATIONS

This application is a U.S. non-provisional patent application that claims the benefit of a co-pending Indian provisional patent application serial no. 201711020237 filed Jun. 9, 2017. The aforementioned related patent application is incorporated herein by reference in its entirety.

FIELD

The present disclosure provides electrolyte solutions for electrodeposition of zinc-iron alloys, methods of forming electrolyte solutions, and methods of electrodepositing zinc-iron alloys.

BACKGROUND

Development of corrosion resistant coatings is of commercial interest in, for example, the aerospace and automobile industries. In particular, the development of zinc (Zn) coatings has been an area of interest for protection of aerospace and automobile components made of steel. To further improve the corrosion resistance of zinc coatings, zinc alloys can be electrodeposited onto a steel substrate. For example, zinc-nickel (Zn—Ni) alloy has been used in the mass production of steel sheets for automobile bodies and also for small components such as nuts and bolts. Nonetheless, coatings having further improvement in corrosion resistance remain of interest.

Zinc-iron (Zn—Fe) alloy, for example, has excellent corrosion resistance, good weldability, paintability, and formability. In addition, zinc-iron alloy having high iron content serves as an effective undercoating for paints. Furthermore, the time for white rust formation of typical zinc-iron alloy coatings is often two to three times longer than that of a pure zinc metal coating.

Zinc-iron alloys can be deposited by electrodeposition. Electrodeposition of zinc-iron alloys often involves electrolyte solutions having a cyanide, an acid sulphate, ammonium chloride and/or an acid chloride. However, electrodeposition using these electrolyte solutions tends to deposit zinc metal onto a substrate under plating conditions in much larger quantities as compared to iron deposition. Commercially operated baths deposit less than 1% iron with zinc. This occurs because of formation of zinc hydroxide ($Zn(OH)_2$) which inhibits the deposition of iron onto the substrate. $Zn(OH)_2$ also adsorbs onto the cathode. Furthermore, complexing agents, such as ammonium chloride or amine based compounds complex very strongly with iron salts in the electrolyte solution which hinders iron metal deposition onto a substrate. Thus, formation of zinc alloys having high iron content is difficult to achieve and, accordingly, so are the beneficial properties of iron in a zinc iron alloy.

Therefore, there is a need in the art for improved electrolyte solutions for electrodeposition of zinc-iron alloys, methods of forming zinc-iron alloys, and methods of electrodepositing zinc-iron alloys.

SUMMARY

The present disclosure provides electrolyte solutions for electrodeposition of zinc-iron alloys, methods of forming electrolyte solutions, and methods of electrodepositing zinc-iron alloys.

At least one electrolyte solution for electroplating includes an alkali metal citrate, an alkali metal acetate, a citric acid, and glycine.

At least one electrolyte solution is formed by dissolving an alkali metal citrate, an alkali metal acetate, a citric acid, and glycine in water or an aqueous solution.

At least one method of electrodepositing zinc-iron alloys onto a substrate includes introducing a cathode and an anode into an electrolyte solution comprising an alkali metal citrate, an alkali metal acetate, the metal salts, a citric acid, and glycine. A current is introduced between the cathode and the anode through the electrolyte solution to deposit zinc and iron onto the cathode.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
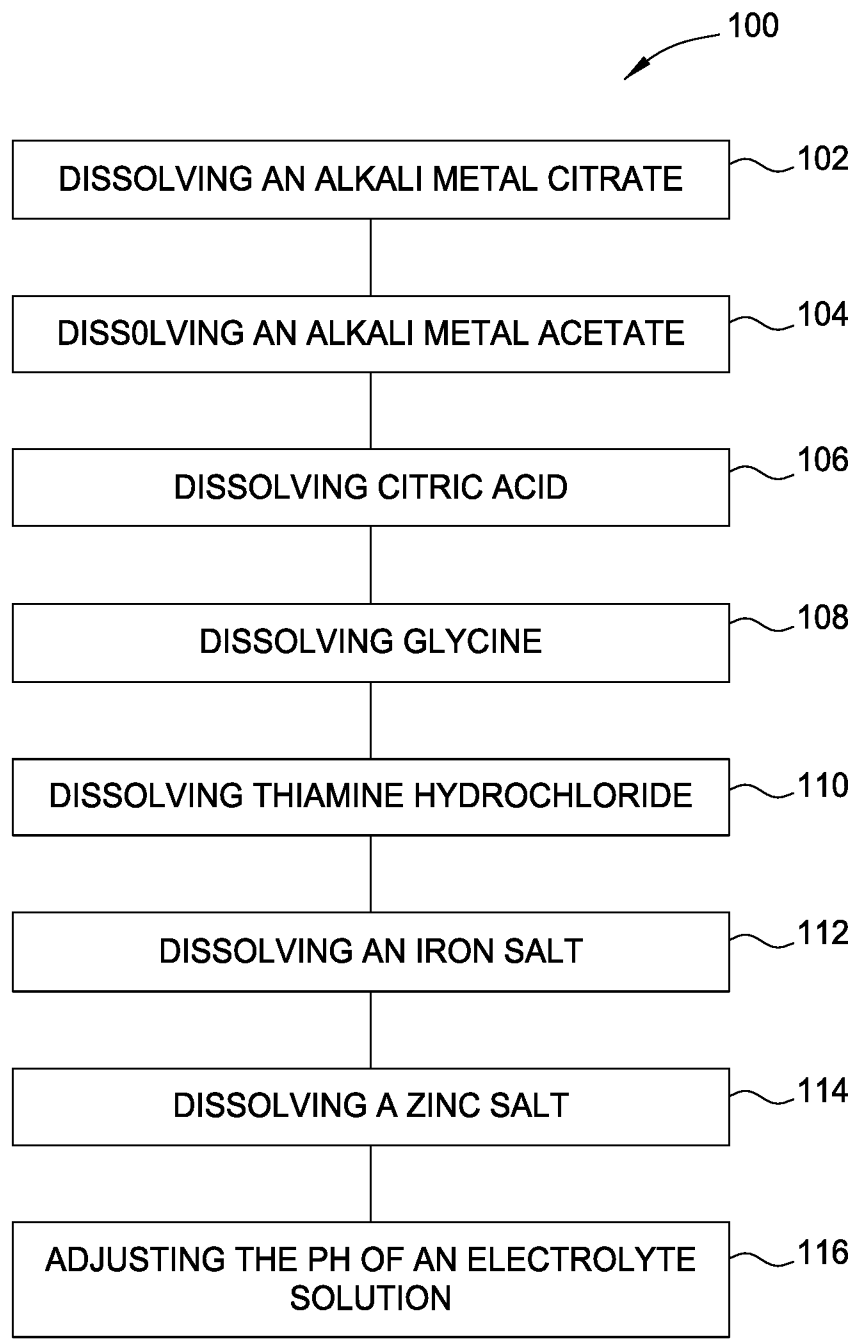
FIG. 1 is a flow diagram illustrating a method for forming an electrolyte solution according to an aspect of the present disclosure.

The present disclosure provides electrolyte solutions for electrodeposition of zinc-iron alloys and methods of forming zinc-iron alloys. In at least one aspect, electrolyte solutions of the present disclosure are aqueous. In at least one aspect, an electrolyte solution comprises a zinc salt, such as zinc sulphate, and an iron salt, such as ferrous sulphate. Electrolyte solutions of the present disclosure further comprise at least one complexing agent selected from glycine and thiamine hydrochloride (THC). It has been discovered that one or more of these complexing agents present in an electrolyte solution provides deposition of high iron content zinc-iron alloy layers on a substrate, such as a steel substrate. Electrolyte solutions of the present disclosure further comprise at least one buffering agent selected from citric acid, sodium acetate, sodium citrate, and boric acid. It has been discovered that sodium acetate, sodium citrate, and citric acid are mild iron stabilizing agents, which provide deposition of high iron content zinc-iron alloy layers on a substrate, such as a steel substrate.

Electrolyte solutions of the present disclosure provide controllable zinc-iron alloy deposition on a substrate. In at least one aspect, a substrate is a steel substrate, copper substrate, brass substrate, copper-coated substrate, nickel-coated substrate, or other metal or metal alloy-containing substrate. In at least one aspect, iron content of a zinc-iron alloy of the present disclosure is from about 1 wt % iron to about 20 wt % iron based on the total weight of the alloy. Changes in iron deposition can be less affected at lower pH, such as 3-4, but iron deposition can be more affected at higher pH such as 5-6. Lower pH can decrease amount of deposition of iron content and higher pH can cause precipitation in the electrolyte bath and poor deposits.

Zinc-iron alloy coatings of the present disclosure provide high corrosion resistance for substrates, such as steel substrates (for example, no red rust observed after salt spray testing for 500 hours or more, and in some examples 1000 hours or more), and pass a number of tests for use as coatings such as hydrogen embrittlement and salt spray tests. Zinc-iron alloys of the present disclosure may be disposed on components of aircraft, spacecraft, watercraft, engine and blown-flap, exhaust-washed structures, warm-structure components for high-performance supersonic, hypersonic, and space re-entry vehicle structures, automobile parts, architectural structures such as steel bridges and propulsion structures such as power-generation turbines, vehicle engines, alternative-energy applications, and related technologies. As one specific example, alloys of the present disclosure may be disposed on steel-based landing gears and/or a bottom surface of an aircraft.

In at least one aspect, the zinc-iron coatings of the present disclosure are multilayered electrodeposited coatings referred to as composition modulated multilayered alloy (CMMA) coatings. CMMA coatings are one way to improve the corrosion resistance capability of a coating as compared to, for example, a monolithic zinc-nickel alloy coating. CMMA coatings have a plurality of thin alternating metal layers or alloy layers, and each layer plays its own distinctive role in achieving preferred performances. For example, a zinc-iron alloy layer has a barrier effect (a barrier against moisture exposure of the substrate) for protection of a steel substrate while the zinc metal in the layer has a sacrificial effect (e.g., degrades over time). Such CMMA coatings typically have improved corrosion resistance as compared to monolithic coatings of the same thickness as the CMMA coating. For CMMA coatings, each layer has a different corrosion potential relative to an adjacent layer. Therefore, the corrosion current that is flowing will be blocked by an adjacent layer having a different corrosion potential, which reduces or prevents corrosion potential from reaching the substrate. Another possible phenomena could be that the less noble layer (e.g., layer having less iron content) corrodes preferentially and the corrosion products block the pores of an adjacent layer, thereby making it protective.

In at least one aspect, CMMA coatings of the present disclosure are formed using a single bath technique. The deposition vessel is a glass beaker at a lab scale or large polypropylene tanks for plating on a commercial scale. In at least one aspect, the deposition vessel contains an electrolyte solution that is prepared by mixing all ingredients of the electrolyte solution concurrently or in a stepwise manner starting with the complexing agents followed by zinc and iron salts. The anode (graphite or zinc) is introduced into the beaker containing electrolyte solution, as described in more detail below. The deposition process is modulated by altering the pulse sequence (from low current density to high current density, or from high current density to low current density) which creates the successive layers of alternating metal composition (e.g., alternating layers having different iron content). The thickness of each layer can be controlled by the duration of the energy pulse applied to the electrolyte solution electrodes. In at least one aspect, the total thickness of a CMMA coating is from about 1 micron to about 100 microns, such as from about 10 microns to about 50 microns, such as from about 20 microns to about 40 microns, for example about 30 microns. The thickness of the individual CMMA layers may range from 0.1 to 5 microns by varying the current density, time of deposition and pulse duration. In at least one aspect, CMMA coatings of the present disclosure have one or more passivation/conversion coatings disposed thereon. Such coatings include Hex-chrome or Tri-chrome based passivation/conversion coatings that are commercially available.

CMMA coatings of the present disclosure can comprise a plurality of alternating layers where:

(1) the alternating layers have the same thickness and the same composition (e.g., iron content);

(2) the alternating layers have the same thickness but have a different composition (e.g., two or more of the layers have a different iron content);

(3) the alternating layers have different thickness (e.g., two or more of the layers have a different thickness) and have different composition;

(4) the alternating layers each have a different thickness, but the plurality of layers includes two different alternating compositions (e.g., a first layer has a first iron content, a second layer has a second iron content, and a third layer has the first iron content (i.e., the third layer has the same iron content the first layer);

(5) the alternating layers each have the same thickness, but each composition of each layer differs from the composition of the other layers (a graded alloy composition);

(6) the alternating layers each have a different thickness and each composition of each layer differs from the composition and thickness of the other layers (also a graded alloy composition).

Varying the thickness and composition of a CMMA coating can be controlled by current density and time scale of a deposition process of the present disclosure.

In at least one aspect, an electrolyte solution is aqueous and comprises a metal salt. In at least one aspect, metal salts include one or more of a zinc salt and an iron salt. In at least one aspect, electrolyte solutions of the present disclosure further comprise at least one complexing agent selected from glycine and thiamine hydrochloride (THC). Complexing agents, such as glycine, coordinate to iron ions in an electrolyte solution and also promote controllable iron deposition on a substrate upon application of a current density to the electrolyte solution.

Electrolyte solutions of the present disclosure further comprise at least one buffering agent selected from citric acid, sodium acetate, sodium citrate, and boric acid. Buffering agents of the present disclosure maintain a desirable pH of the electrolyte solution and do not substantially interfere with iron deposition on a substrate, as described in more detail below. In at least one aspect, the pH of electrolyte solutions of the present disclosure are between about 2 and about 6, such as between about 3 and about 5, for example the pH is 3 or 5. In at least one aspect, the pH of electrolyte solutions of the present disclosure are controlled by addition of one or more bases, such as a sodium hydroxide (NaOH) solution, to increase the pH of the solution or addition of one or more acids, such as a sulfuric acid ($H_2SO_4$) solution, to decrease the pH of the solution. pH is also maintained by appropriate combinations of alkali metal citrate and citric acid. Zinc salts, iron salts, complexing agents, buffering agents, acids, and bases can be obtained from any suitable commercial source, such as MERCK-India or Sigma-Aldrich Co. LLC of St. Louis, Mo.

Electrodeposition can include preparing an electrolyte solution and passing current between an anode and a cathode in the electrolyte solution. FIG. 1 is a flow diagram illustrating a method 100 for forming an electrolyte solution.

As shown in FIG. 1, method 100 includes dissolving 102 an alkali metal citrate in water in a vessel, such as a beaker, to form a first electrolyte solution. In at least one aspect, an alkali metal citrate is a sodium citrate, potassium citrate, and/or other alkali metal citrate. Sodium citrates include citric acid trisodium salt, citric acid disodium salt, citric acid monosodium salt, or other sodium citrate. Potassium citrates include citric acid tripotassium salt, citric acid dipotassium salt, citric acid monopotassium salt, or other potassium citrate. In at least one aspect, an alkali metal citrate includes its respective hydrated forms. For example, citric acid trisodium salt has the formula $Na_3C_6H_5O_7.xH_2O$, where x is a whole number (e.g., 0, 1, or 2). Accordingly, citric acid trisodium salt can be, for example, anhydrous citric acid trisodium salt, citric acid trisodium salt monohydrate, or citric acid trisodium salt dihydrate. In at least one aspect, the alkali metal citrate is dissolved in water or aqueous solution, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the alkali metal citrate has been dissolved.

In at least one aspect, the concentration of an alkali metal citrate in an electrolyte solution of the present disclosure is from about 0.001 moles per liter (mol/L) to about 0.1 mol/L, such as from about 0.01 mol/L to about 0.05 mol/L, such as from about 0.01 mol/L to about 0.03 mol/L of the electrolyte solution, for example about 0.001 mol/L, about 0.017 mol/L, about 0.018 mol/L, about 0.019 mol/L, or about 0.1 mol/L.

Method 100 further includes dissolving 104 an alkali metal acetate, for example, in water or an aqueous solution (such as the first solution) to form an electrolyte solution (e.g., a second electrolyte solution). In at least one aspect, an alkali metal acetate is a sodium acetate, potassium acetate, and/or other alkali metal acetate. Sodium acetates include acetic acid sodium salt. Potassium citrates include acetic acid potassium salt. In at least one aspect, an alkali metal acetate includes its respective hydrated forms. For example acetic acid sodium salt has the formula $CH_3COONa.xH_2O$, where x is a whole number (e.g., 0, 1, or 2). In at least one aspect, the alkali metal acetate is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the alkali metal acetate has been dissolved.

In at least one aspect, the concentration of an alkali metal acetate in an electrolyte solution of the present disclosure is from about 0.1 moles per liter (mol/L) to about 3 mol/L, such as from 0.2 mol/L to about 1 mol/L, such as from about 0.5 mol/L to about 0.8 mol/L of the electrolyte solution, for example about 0.1 mol/L, about 0.65 mol/L, about 0.75 mol/L, about 0.85 mol/L, or about 3 mol/L.

Method 100 further includes dissolving 106 citric acid, for example, in water or an aqueous solution (such as the second solution to form an electrolyte solution, (e.g., a third electrolyte solution). In at least one aspect, citric acid can includes its respective hydrated forms. For example, citric acid has the formula $C_6H_8O_7.xH_2O$, where x is a whole number (e.g., 0, 1, or 2). In at least one aspect, citric acid is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the citric acid has been dissolved.

In at least one aspect, the concentration of citric acid in an electrolyte solution of the present disclosure is from about 0.01 moles per liter (mol/L) to about 3 mol/L, such as from about 0.05 mol/L to about 1 mol/L, such as from about 0.1 mol/L to about 0.5 mol/L of the electrolyte solution, for example about 0.01 mol/L, about 0.08 mol/L, about 0.1 mol/L, about 0.12 mol/L, or about 3 mol/L.

Method 100 further includes dissolving 108 glycine, for example, in water or an aqueous solution (such as the third solution) to form an electrolyte solution (e.g., a fourth electrolyte solution). In at least one aspect, glycine includes its respective salt forms. In at least one aspect, glycine is one or more of glycine sodium salt, glycine potassium salt, and glycine zinc salt. Glycine zinc salt can participate as a source of zinc ions in the electrolyte solution for zinc deposition onto a substrate. In at least one aspect, glycine includes its respective hydrated forms. For example, glycine has the formula $NH_2CH_2COOH.xH_2O$, where x is a whole number (e.g., 0, 1, or 2). In at least one aspect, glycine is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the glycine has been dissolved.

In at least one aspect, the concentration of glycine in an electrolyte solution of the present disclosure is from about 0.01 moles per liter (mol/L) to about 2 mol/L, such as from 0.1 mol/L to about 1 mol/L, such as from about 0.12 mol/L to about 0.5 mol/L of the electrolyte solution, for example about 0.01 mol/L, about 0.13 mol/L, about 0.14 mol/L, about 0.15 mol/L, or about 2 mol/L.

Method 100 further includes dissolving 110 thiamine hydrochloride or thiamine, for example, in water or an aqueous solution (such as the fourth solution) to form an electrolyte solution (e.g, a fifth electrolyte solution). The combination of citric acid and thiamine hydrochloride, for example, act as a brightening agent for a deposited alloy. In at least one aspect, thiamine hydrochloride or thiamine include their respective hydrated forms. For example, thiamine hydrochloride has the formula $C_{12}H_{17}ClN_4OS.HCl.xH_2O$, where x is a whole number (e.g., 0, 1, or 2). In at least one aspect, thiamine hydrochloride or thiamine are dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the thiamine hydrochloride or thiamine has been dissolved.

In at least one aspect, the concentration of thiamine hydrochloride in an electrolyte solution of the present disclosure is from about 0.0001 moles per liter (mol/L) to about 1 mol/L, such as from 0.001 mol/L to about 0.01 mol/L, such as from about 0.001 mol/L to about 0.003 mol/L of the electrolyte solution, for example about 0.0001 mol/L, about 0.0014 mol/L, about 0.0015 mol/L, about 0.0016 mol/L, or about 1 mol/L. In at least one aspect, the concentration of thiamine in an electrolyte solution of the present disclosure is from about 0.01 g/L to about 2 g/L, such as from 0.1 g/L to about 1 g/L, such as from 0.3 g/L to about 0.7 g/L, for example about 0.01 g/L, about 0.4 g/L, about 0.5 g/L, about 0.6 g/L, or about 2 g/L.

Method 100 further includes dissolving 112 an iron salt, for example, in water or an aqueous solution (such as the fifth solution) to form an electrolyte solution (e.g., a sixth electrolyte solution). In at least one aspect, the iron salt is a divalent iron salt. In at least one aspect, a divalent iron salt includes iron (II) sulfate, iron (II) chloride, iron (II) acetate, and/or other divalent iron salt. Each of these divalent iron salts can include its respective hydrated forms. For example, iron (II) sulfate has the formula $FeSO_4.xH_2O$, where x is a whole number (e.g., 0, 1, 2, 4, 5, 6, or 7). Accordingly, in at least one aspect, iron (II) sulfate is anhydrous iron (II) sulfate, iron (II) sulfate monohydrate, iron (II) sulfate dihydrate, iron (II) sulfate tetrahydrate, iron (II) sulfate pentahydrate, iron (II) sulfate hexahydrate, iron (II) sulfate heptahydrate, or iron (II) sulfate with another hydration state. In at least one aspect, the iron salt is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the iron salt has been dissolved.

In at least one aspect, the concentration of an iron salt in an electrolyte solution of the present disclosure is from about 0.01 moles per liter (mol/L) to about 0.5 mol/L, such as from about 0.03 mol/L to about 0.45 mol/L, such as from about 0.05 mol/L to about 0.4 mol/L, such as from about 0.1 mol/L to about 0.3 mol/L of the electrolyte solution, for example about 0.01 mol/L, about 0.07 mol/L, about 0.35 mol/L, or about 0.5 mol/L.

Method 100 further includes dissolving 114 a zinc salt, for example, in water or an aqueous solution (such as the sixth solution) to form an electrolyte solution (e.g., a seventh electrolyte solution). The zinc salt can be a divalent zinc salt. In at least one aspect, a divalent zinc salt is zinc (II) sulfate, zinc (II) chloride, zinc (II) acetate, and/or other divalent zinc salt. In at least one aspect, each of these divalent zinc salts include its respective hydrated forms. For example, zinc (II) sulfate has the formula ZnSO4.xH2O, where x is a whole number (e.g., 0, 1, 2, 4, 5, 6, or 7). Accordingly, in at least one aspect, zinc (II) sulfate is anhydrous zinc (II) sulfate, zinc (II) sulfate monohydrate, zinc (II) sulfate dihydrate, zinc (II) sulfate tetrahydrate, zinc (II) sulfate pentahydrate, zinc (II) sulfate hexahydrate, zinc (II) sulfate heptahydrate, or zinc (II) sulfate with another hydration state. In at least one aspect, the zinc salt is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the zinc salt has been dissolved.

In at least one aspect, the concentration of a zinc salt in an electrolyte solution of the present disclosure is from about 0.01 moles per liter (mol/L) to about 0.5 mol/L, such as from 0.1 mol/L to about 0.4 mol/L, such as from about 0.15 mol/L to about 0.3 mol/L, such as from 0.15 mol/L to about 0.2 mol/L of the electrolyte solution, for example about 0.01 mol/L, about 0.16 mol/L, 0.17 mol/L, about 0.18 mol/L, or about 0.5 mol/L.

Method 100 further includes adjusting 116 the pH of the electrolyte solution using one or more aqueous acid solutions or aqueous base solutions, such as potassium hydroxide (KOH), sodium hydroxide (NaOH), and/or sulfuric acid ($H_2SO_4$). The volume of aqueous acid solution or aqueous base solution added to the electrolyte solution is sufficiently small such that the concentration of other components (complexing agents, buffering agents, etc.) of the electrolyte solution is not substantially affected. Alternatively, solid potassium hydroxide and/or solid sodium hydroxide is added directly to the electrolyte solution and/or concentrated sulfuric acid is added directly to the electrolyte solution. In at least one aspect, the pH of the electrolyte solution is adjusted to a target pH from about 2 to about 7, such as from about 3 to about 6, such as from about 3 to about 5, for example 3, 3.5, 4, 4.5, or 5. In at least one aspect, the pH of an electrolyte solution of the present disclosure is adjusted before passing a current through the electrolyte solution (as described in more detail below). In at least one aspect, the pH of an electrolyte solution of the present disclosure is maintained at a target pH or a target pH range during the passing of a current through the electrolyte solution.

Furthermore, in at least one aspect, methods of the present disclosure include dissolving a borate, for example, in water or an aqueous solution to form an electrolyte solution. A borate can be dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the borate has been dissolved.

In at least one aspect, the concentration of borate in an electrolyte solution of the present disclosure is from about 0.01 moles per liter (mol/L) to about 2 mol/L, such as from 0.1 mol/L to about 1.5 mol/L, such as from about 0.5 mol/L to about 1 mol/L of the electrolyte solution, for example about 0.01 mol/L, about 0.85 mol/L, about 0.9 mol/L, about 0.95 mol/L, about 1 mol/L, or about 2 mol/L.

Figure 2:
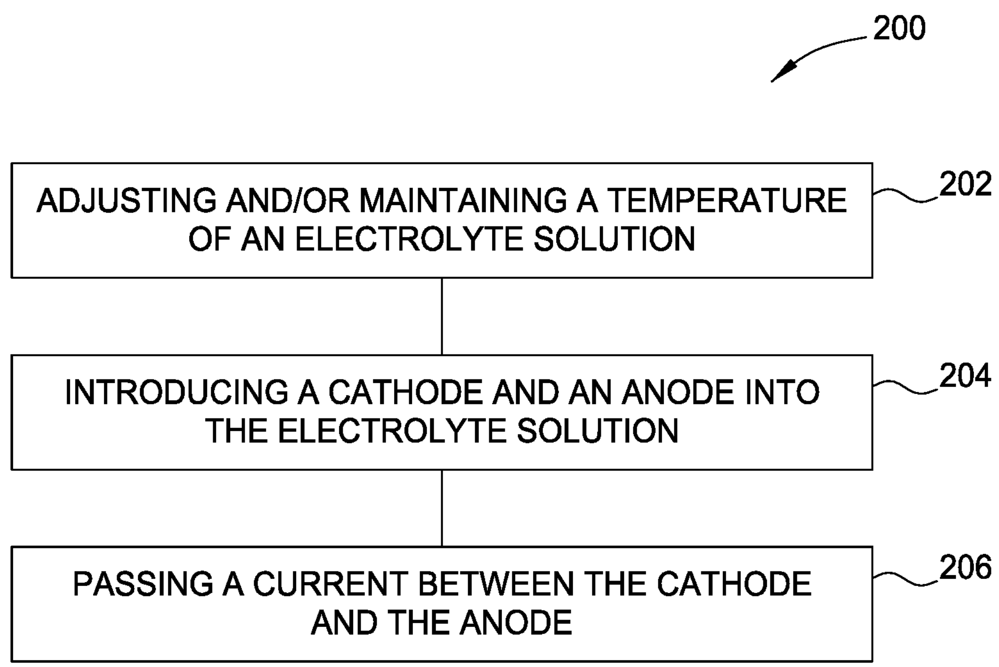
FIG. 2 is a flow diagram illustrating a method for forming a zinc-iron coating of the present disclosure on a substrate by electrodeposition according to an aspect of the present disclosure.

FIG. 2 is a flow diagram illustrating a method 200 for forming a zinc-iron coating of the present disclosure on a substrate by electrodeposition. Method 200 includes adjusting and/or maintaining 202 a temperature of an electrolyte solution, such as an electrolyte solution formed by method 100. The temperature may be adjusted to/maintained at a target temperature of from about 20° C. to about 70° C., such as from about 20° C. to about 40° C., such as from about 20° C. to about 35° C., for example 20° C., 25° C., or 30° C., using any suitable heating or cooling apparatus. In at least one aspect, the temperature of an electrolyte solution is adjusted before passing a current through the electrolyte solution. In at least one aspect, the temperature of an electrolyte solution is maintained during the passing of a current through an electrolyte solution to maintain the appearance of a deposited layer. Maintaining the temperature within a desirable range promotes obtaining reproducible results in terms of appearance and alloy composition.

Method 200 further includes introducing 204 a cathode and an anode into the electrolyte solution, the cathode including the substrate, and passing 206 a current between the cathode and the anode through the electrolyte solution to deposit zinc and iron onto the cathodic substrate. In at least one aspect, the cathodic substrate is, for example, a steel substrate, a copper substrate, a brass substrate, a nickel substrate, a copper-coated substrate, or a nickel-coated substrate.

In at least one aspect, an anode includes a zinc material, platinum material, platinized titanium material, or a carbonaceous electrode material. For example, zinc can be used as an anode and it also provides replenishment of zinc concentration to the electrolyte solution. A carbonaceous anode can be a graphite anode or other anode that includes carbon. A graphite anode or other carbonaceous anode minimizes gas evolution and formation of byproducts, as well as facilitating a desired deposition rate (e.g., from about 1 micron per minute to about 2 microns per minute). In at least one aspect, a deposition rate of metal on a substrate is from about 0.1 micron per minute to about 10 microns per minute, such as from about 0.5 micron per minute to about 5 microns per minute, such as from 1 micron per minute to about 2 microns per minute, for example about 1 micron per minute, about 1.5 microns per minute, about 2 microns per minute.

In at least one aspect, passing 206 a current between the cathode and the anode is performed using direct current. In at least one aspect, direct current having a current density of from about 5 mA/cm$^2$ to about 500 mA/cm$^2$, such as from about 10 mA/cm$^2$ to about 300 mA/cm$^2$, such as from about 10 mA/cm$^2$ to about 250 mA/cm$^2$, such as from about 10 mA/cm$^2$ to about 200 mA/cm$^2$, such as from about 30 mA/cm$^2$ to about 150 mA/cm$^2$, for example 20 mA/cm$^2$, 50 mA/cm$^2$, 150 mA/cm$^2$ is used. For CMMA coatings, a pulsed current is used. In at least one aspect, the current density of each pulse is from about 5 mA/cm$^2$ to about 500 mA/cm$^2$, such as from about 20 mA/cm$^2$ to about 300 mA/cm$^2$, such as from about 20 mA/cm$^2$ to about 250 mA/cm$^2$, such as from about 30 mA/cm$^2$ to about 150 mA/cm$^2$, for example 20 mA/cm$^2$, 50 mA/cm$^2$, 150 mA/cm$^2$.

In at least one aspect, a pulsed current has a duty cycle from about 20% to about 95%, such as from about 40% to about 90%, such as from 75% to about 90%, for example, about 80%, about 85%, or about 90%. In at least one aspect, a pulsed current has a frequency ranging from about 10 Hz to about 100 Hz, such as from about 20 Hz to about 80 Hz, such as from 50 Hz to about 70 Hz, for example about 20 Hz, about 25 Hz, or about 30 Hz. In at least one aspect, one or more pulses of a series of pulses have a duration ('ON time') of from about 1 millisecond to about 1,000 milliseconds, such as from about 5 milliseconds to about 800 milliseconds, such as from about 20 milliseconds to about 500 milliseconds, such as from about 50 milliseconds to about 200 milliseconds, such as from about 10 milliseconds to about 30 milliseconds, for example about 15 milliseconds, about 25 milliseconds, or about 30 milliseconds. There is also a duration of time in between each pulse (an 'OFF time') of from about 1 millisecond to about 1000 milliseconds, depending on the 'ON time'. In one aspect, a duration of time in between each pulse is from about 5 milliseconds to about 500 milliseconds, such as from about 10 milliseconds to about 200 milliseconds, for example about 15 milliseconds, about 25 milliseconds, or about 30 milliseconds.

In response to passing 206 a current between the cathode and the anode, zinc and iron deposit onto the cathodic substrate. Passing 206 is performed until a zinc-iron coating layer having a desired thickness is formed on the substrate. The zinc-iron coating layer is a zinc-iron alloy having from about 1 wt % iron to about 60 wt % iron, such as from about 1 wt % iron to about 20 wt % iron, such as from about 1 wt % iron to about 5 wt % iron or from about 10 wt % iron to about 20 wt % iron based on the total weight of the alloy. For example, the zinc-iron alloy can have a wt % iron of about 1 wt %, 2 wt %, 10 wt %, 11 wt %, or 12 wt %. Furthermore, the zinc-iron alloy has from about 80 wt % zinc to about 99 wt % zinc, such as from about 85 wt % zinc to about 95 wt % zinc, for example about 99 wt % zinc, 98 wt % zinc, 90 wt % zinc, 89 wt % zinc, or 88 wt % zinc, based on the total weight of the alloy.

In at least one aspect, passing 206 is repeated to deposit one or more additional coating layers onto an already deposited zinc-iron coating layer. The thickness of each layer formed on the substrate (or previously deposited layer) is controlled by the duration of an energy (current) pulse applied to the electrodes in the electrolyte solution. In at least one aspect, the total thickness of coatings deposited on a substrate is from about 1 micron to about 200 microns, such as from about 10 microns to about 100 microns, such as from about 20 microns to about 50 microns, for example about 30 microns. In at least one aspect, the total number of layers in a CMMA zinc-iron coating of the present disclosure is from about 2 layers to about 500 layers, such as from about 10 layers to about 200 layers, such as from about 50 layers to about 150 layers, for example about 90 layers, about 100 layers, or about 110 layers.

EXAMPLES

Steel substrates used in the following examples were mild steel, 4130 steel, or 4340 steel substrates.

Example 1

The components of Example 1 were mixed in a stepwise manner starting with the complexing agents first followed by metal salts. The pH of Example 1 was 3.

| Example 1 | | |
|---|---|---|
| Zinc sulphate ($ZnSO_4 \cdot 7H_2O$) | 50 g/L | 0.174M |
| Ferrous sulphate ($FeSO_4 \cdot 7H_2O$) | 20 g/L | 0.072M |
| Na acetate ($CH_3COONa$) | 60 g/L | 0.731M |
| Na citrate ($C_6H_5Na_3O_7 \cdot 2H_2O$) | 5.3 g/L | 0.018M |
| Glycine ($NH_2CH_2COOH$) | 11 g/L | 0.146M |
| Citric acid ($C_6H_8O_7 \cdot H_2O$) | 21.2 g/L | 0.1M |
| Thiamine hydrochloride ($C_{12}H_{17}ClN_4OS \cdot HCl$) | 0.5 g/L | 0.0015M |

Example 2

The components of Example 2 were mixed in a stepwise manner starting with the complexing agents first followed by metal salts. The pH of Example 2 was 5.

| Example 2 | | |
|---|---|---|
| Zinc sulphate ($ZnSO_4 \cdot 7H_2O$) | 50 g/L | 0.0174M |
| Ferrous sulphate ($FeSO_4 \cdot 7H_2O$) | 100 g/L | 0.36M |
| Na acetate ($CH_3COONa$) | 60 g/L | 0.731M |
| Na citrate ($C_6H_5Na_3O_7 \cdot 2H_2O$) | 5.3 g/L | 0.018M |
| Glycine ($NH_2CH_2COOH$) | 11 g/L | 0.146M |
| Citric acid ($C_6H_8O_7 \cdot H_2O$) | 21.2 g/L | 0.1M |
| Thiamine hydrochloride ($C_{12}H_{17}ClN_4OS \cdot HCl$) | 0.5 g/L | 0.0015M |

Using each of the electrolyte solutions of Example 1 and Example 2, CMMA zinc-iron alloy coatings were deposited by a pulse current method by alternating pulses at two different current densities, 50 mA/cm$^2$ and 20 mA/cm$^2$. The pulse duration of each pulse was performed such that substantially equal layer thicknesses at each current density were achieved and 50 layers at each current density were deposited alternatively using a Dynatronix Pulse rectifier. A total of 100 layers having a total thickness of about 30 microns was achieved. The deposition was performed in a single bath vessel.

For the electrolyte solution of Example 1, the zinc-iron alloy layers deposited at 20 mA/cm$^2$ had an iron content of about 1 wt %, while the zinc-iron alloy layers deposited at 50 mA/cm$^2$ had an iron content of about 2 wt %. For the electrolyte solution of Example 2, the zinc-iron alloy layer deposited at 50 mA/cm$^2$ had an iron content of about 1 wt % by wt., while the zinc-iron alloy layer deposited at 150 mA/cm$^2$ had an iron content of about 11 wt %.

Table 1 illustrates dependence of iron content on the pH of the electrolyte solution of Example 1. The electrolyte solution of Example 1 was titrated with NaOH solution until reaching a pH of 3.5 or 5. Then, electrodeposition was performed as described for Examples 1 and 2. As shown in Table 1, changes in pH or current density do not affect the deposited alloy composition of an electrodeposited coating very much. More specifically, the variation in iron content is between about 0.5 wt % to about 2.5%.

TABLE 1

| pH | iron content 50 mA/cm$^{-2}$ | iron content 150 mA/cm$^{-2}$ | Remarks/appearance |
|---|---|---|---|
| 3.5 | Fe = 0.83 wt % | Fe = 1.46 wt % | Bright |
| 5.0 | Fe = 0.88 wt % | Fe = 2.47 wt % | Dull metallic |

Table 2 illustrates dependence of iron content on the pH of the electrolyte solution of Example 2. The electrolyte solution of Example 2 was titrated with NaOH solution until reaching a pH of 6 or was titrated with $H_2SO_4$ solution until reaching a pH of 3, 4, or 5. Then, electrodeposition was performed as described for Examples 1 and 2. As shown in Table 2, a change in current density for pH 3 or 4 do not affect the alloy composition much, but at pH 5 and 6, the changes are larger.

TABLE 2

| pH | iron content 50 mA cm$^{-2}$ | iron content 150 mA cm$^{-2}$ | Remarks/appearance 50 mA 150 mA |
|---|---|---|---|
| 3.0 | Fe = 1.2 wt % | Fe = 2.5 wt % | Bright Blackish metallic |
| 4.0 | Fe = 1.4 wt % | Fe = 3.5 wt % | Bright Bright |
| 5.0 | Fe = 1.8 wt % | Fe = 11.7 wt % | Dull Very Bright |
| 6.0 | Fe = 8.9 wt % | Fe = 62.4 wt % | Grey Brown red |

Example 3

The components of Example 3 were mixed in a stepwise manner starting with the complexing agents first followed by metal salts. Example 3 has an identical composition as Example 2, but the thiamine hydrochloride is not present in Example 3. Thiamine hydrochloride acts as a brightening agent as well as a complexing agent. Although not as bright, the coatings formed using the electrolyte solution of Example 3 are uniform grey. The advantage of removing this brightening/complexing agent is that it enables higher iron content in the deposit so that the open circuit potential of the deposited layer is not too negative. Furthermore, the consistency of the electrolyte solution and alloy deposits is better.

| Example 3 (pH = 4) | | |
|---|---|---|
| Zinc sulphate ($ZnSO_4 \cdot 7H_2O$) | 50 g/L | 0.0174M |
| Ferrous sulphate ($FeSO_4 \cdot 7H_2O$) | 100 g/L | 0.36M |
| Na acetate ($CH_3COONa$) | 60 g/L | 0.731M |
| Na citrate ($C_6H_5Na_3O_7 \cdot 2H_2O$) | 5.3 g/L | 0.018M |
| Glycine ($NH_2CH_2COOH$) | 11 g/L | 0.146M |
| Citric acid ($C_6H_8O_7 \cdot H_2O$) | 21.2 g/L | 0.1M |

Table 3 illustrates dependence of iron content on the pH of the electrolyte solution of Example 3. The electrolyte solution of Example 3 was titrated with NaOH solution or $H_2SO_4$ solution until reaching a particular pH. Then, electrodeposition was performed as described for Examples 1 and 2. As shown in Table 3, iron content is dependent on pH and current density.

TABLE 3

| pH | iron content 50 mA/cm-2 | iron content 150 mA/cm-2 | Remarks/appearance 50 mAcm-2 150 mAcm-2 |
|---|---|---|---|
| 3.0 | Fe = 2.9 wt % | Fe = 17.4 wt % | Dull bright Grey bright |
| 4.0 | Fe = 3.2 wt % | Fe = 24.5 wt % | Dull bright Light Grey |
| 5.0 | Fe = 9.9 wt % | Fe = 44.5 wt % | Blackish dull Metallic grey |
| 6.0 | Fe = 12.2 wt % | Fe = 61.9 wt % | Grey Metallic grey |

Salt Spray Testing (ASTM B 117)

A conversion coating, chromate coating ALODINE 1200, was disposed on the coated samples and the CMMA coatings were receptive to these conversion coatings. The passivated samples were tested for corrosion protection by Open Circuit Potential measurements and in a salt spray chamber (according to ASTM B 117).

Salt spray results of zinc-iron CMMA coatings deposited from electrolyte solution of Example 1 and passivated with Alodine 1200 indicate corrosion protection of steel substrates of 500 hours or more. No red rust was observed for 1500 hours or more.

Salt spray results of zinc-iron CMMA coatings deposited from electrolyte solution of Example 2 and passivated with Alodine 1200 indicate corrosion protection of steel substrates of 500 hours or more. No red rust was observed for 1000 hours or more. Salt spray results of zinc-iron CMMA coatings deposited from the electrolyte solution of Example 2 and without passivation also indicate corrosion protection of steel substrates of 500 hours or more. No red rust was observed for 750 hours or more.

Without being bound by theory, it is believed that one of the two alternating types of layers (e.g., the layers with lower iron concentration) corrode and the corrosion product of the corroded layer blocks the pores of adjacent layers having higher iron concentration, making the overall CMMA layer more protective than a monolithic zinc-iron alloy layer. Hence, zinc-iron alloy CMMA coatings can also be equally protective without passivation.

Open Circuit Potential:

Open circuit potential was used as a quantitative criterion for the corrosion protection ability of zinc-iron alloy coatings of the present disclosure disposed on steel substrates. The open circuit potential of a coating should be negative to steel, which indicates that the coating provides sacrificial protection to the steel. The open circuit potential is a parameter which indicates the thermodynamic tendency of a material to electrochemical oxidation in a corrosive medium. The open circuit potential of these zinc-iron alloy coatings was measured in distilled water and 3.5% NaCl solution for 16 days as per ASTM G 82. Electrochemical cells were made with the coated surface as the working electrode and a Calomel electrode was used as reference electrode. The temperature during an open circuit potential measurement was maintained at about 30° C.

Figure 3A:
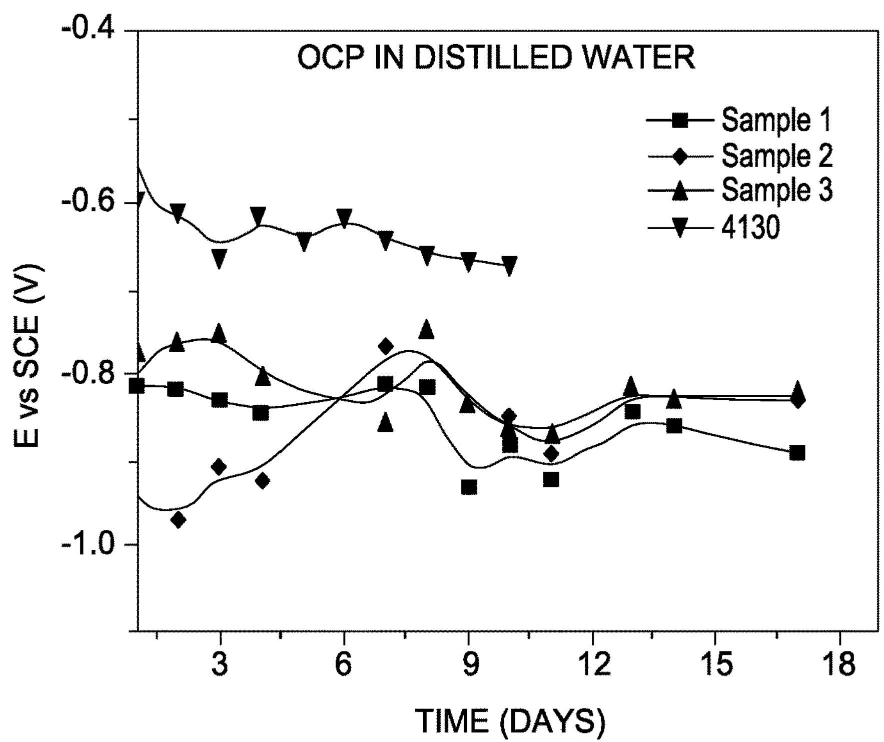
FIG. 3A is a graph illustrating open circuit potential of zinc-iron CMMA coatings in distilled water according to an aspect of the present disclosure.
Figure 3B:
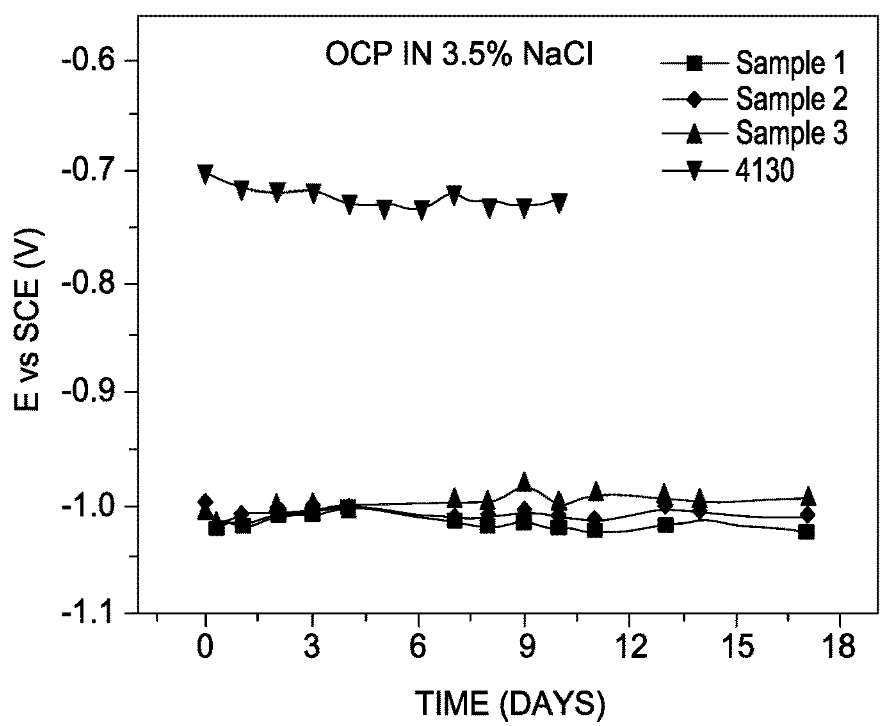
FIG. 3B is a graph illustrating open circuit potential of zinc-iron CMMA coatings in salt water according to an aspect of the present disclosure.

FIGS. 3A and 3B are graphs illustrating open circuit potential of zinc-iron CMMA coatings in distilled water and salt water, respectively. The zinc-iron coatings were deposited from the electrolyte solution of Example 1 and passivated with Alodine 1200. The zinc-iron coatings (samples 1, 2, and 3) were prepared by pulsing at an alternating current density of 50 mA/cm$^2$ and 20 mA/cm$^2$ until a total of 100 layers were obtained for each sample. As shown in FIGS. 3A and 3B, these zinc-iron alloy coatings provide cathodic protection to steel in distilled water and salt water, respectively.

Figure 4A:
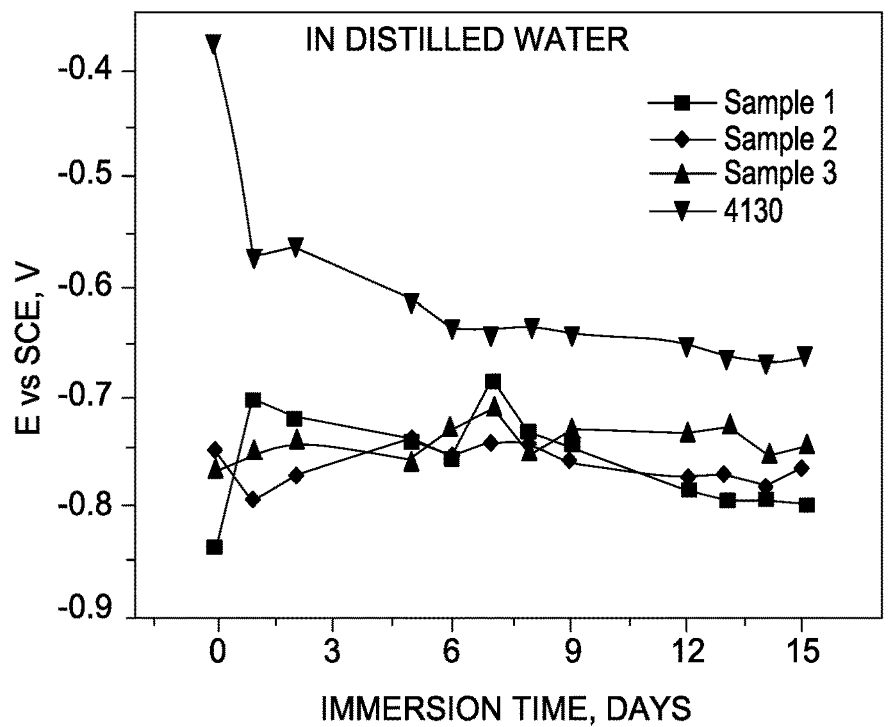
FIG. 4A is a graph illustrating open circuit potential of zinc-iron CMMA coatings in distilled water according to an aspect of the present disclosure.
Figure 4B:
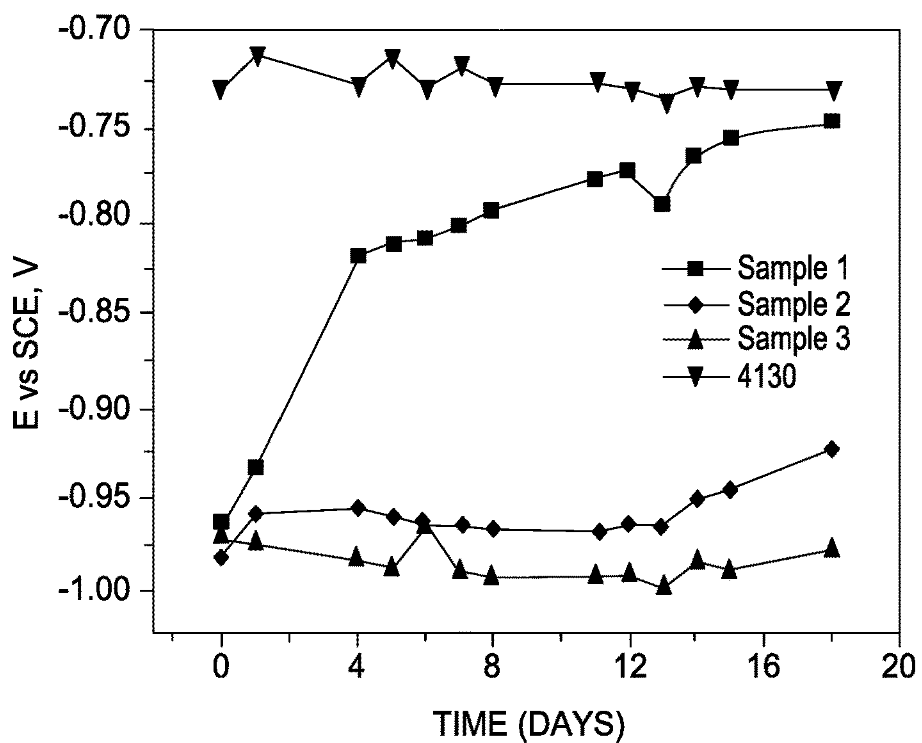
FIG. 4B is a graph illustrating open circuit potential of zinc-iron CMMA coatings in salt water according to an aspect of the present disclosure.

FIGS. 4A and 4B are graphs illustrating open circuit potential of zinc-iron CMMA coatings in distilled water and salt water, respectively. The zinc-iron coatings were deposited from the electrolyte solution of Example 2 and passivated with Alodine 1200. The zinc-iron coatings (samples 1, 2, and 3) were prepared by pulsing at an alternating current density of 50 mA/cm$^2$ and 150 mA/cm$^2$ until a total of 100 layers were obtained for each sample. As shown in FIGS. 4A and 4B, these zinc-iron alloy coatings provide cathodic protection to steel in distilled water and salt water, respectively.

Figure 5:
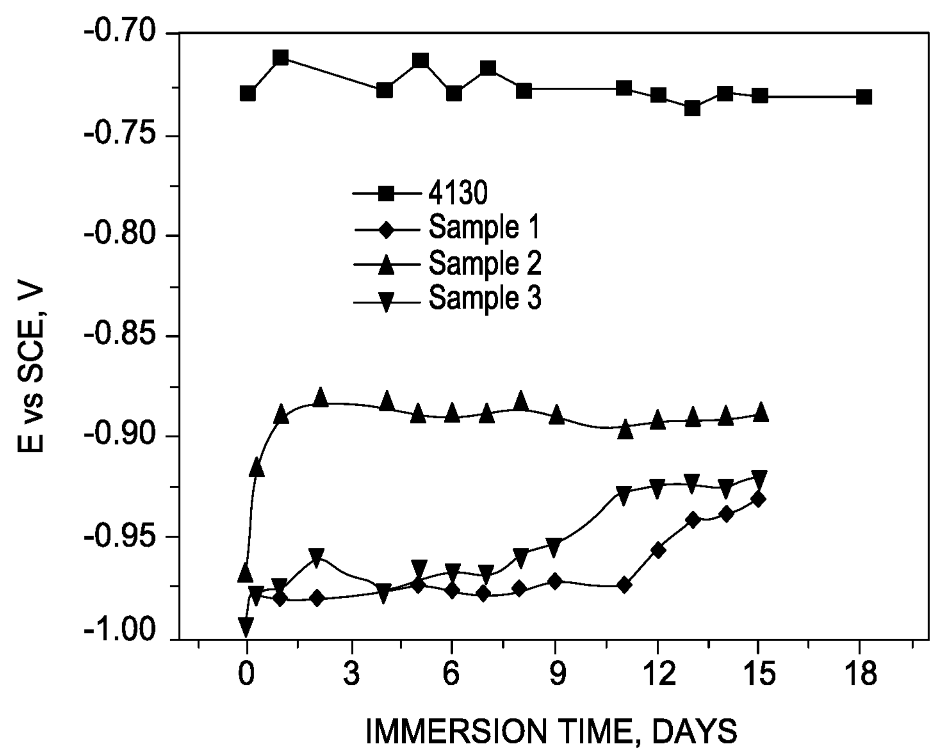
FIG. 5 is a graph illustrating open circuit potential of zinc-iron CMMA coatings in salt water according to an aspect of the present disclosure.

FIG. 5 is a graph illustrating open circuit potential of zinc-iron CMMA coatings in salt water. The zinc-iron coatings were deposited from the electrolyte solution of Example 2 and passivated with Trichrome HB 1701 CF. The zinc-iron coatings (samples 1, 2, and 3) were prepared by pulsing at an alternating current density of 50 mA/cm$^2$ and 150 mA/cm$^2$ until a total of 50 layers were obtained (with about 15 microns in total thickness) for each sample. As shown in FIG. 5, these zinc-iron alloy coatings provide cathodic protection to steel in salt water. These layers also provide 500 hours or more of corrosion protection under the salt spray test (ASTM B 117).

Figure 6A:
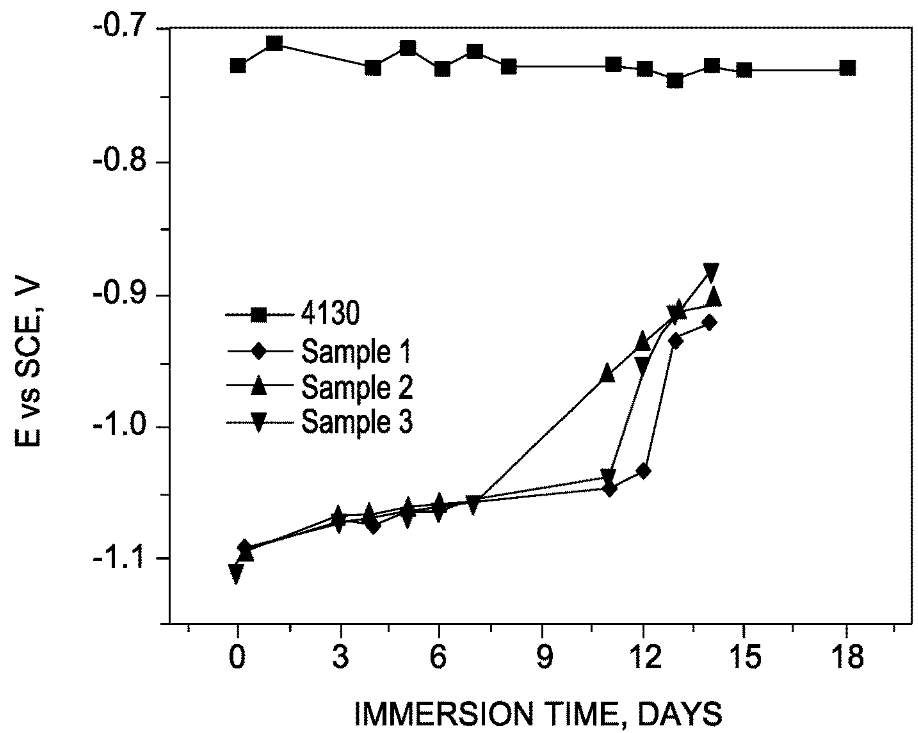
FIG. 6A is a graph illustrating open circuit potential of pure zinc coatings in salt water according to an aspect of the present disclosure.
Figure 6B:
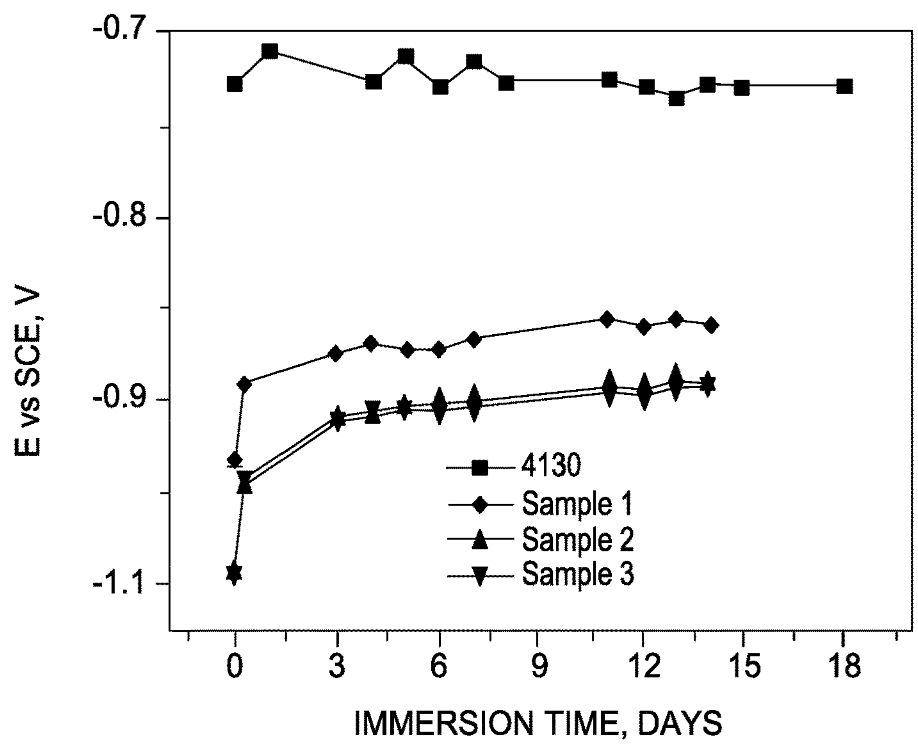
FIG. 6B is a graph illustrating open circuit potential of zinc-iron CMMA coatings in salt water according to an aspect of the present disclosure.

FIGS. 6A and 6B are graphs illustrating open circuit potential of pure zinc coatings and zinc-iron CMMA coatings, respectively, in salt water. The total thickness of all coatings shown in FIGS. 6A and 6B was about 15 microns. As shown in FIGS. 6A and 6B, CMMA layers maintain a more steady potential difference between bare steel and coated steels over a number of days as compared to a pure zinc coating.

Hydrogen Embrittlement and Re-Embrittlement

Hydrogen Embrittlement (HE) tests were performed according to ASTM F 519 using Type 1a.1 specimens having a notch. For HE testing, a load is applied to a notch on a High Strength Steel 4340 sample without any coating to determine an average Notch Fracture Strength (NFS) value based from three uncoated samples. Average NFS for the High Strength Steel 4340 sample was determined to be 3,953 Kg for 200 hours. No failure was observed under ASTM F 519.

Alloys, as described above, were electrodeposited onto new High Strength Steel 4340 samples having a notch. The zinc-iron CMMA coated specimens were passivated, baked (190° C. for 24 hours). Then, 75% load of the average NFS value (75% of 3,953 Kg=2,964.75 Kg, about 2,965 Kg) was applied to the samples and held at this load for 200 hours. No fracturing was observed, indicating that these coatings pass the HE test.

For the Hydrogen Re-Embrittlement test, a specimen is loaded at 45% of NFS and the test is performed as described above, but with exposure of the notch area to a 3.5% NaCl solution. 3 out of 4 specimens tested passed 150 h of loading in saline media, indicating very good resistance of the different CMMA coatings to corrosive embrittling media.

Example 4

The components of Example 4 were mixed in a stepwise manner starting with the complexing agents first followed by metal salts. When deposited at 50 mA/cm$^2$ using the electrolyte composition of Example 4, a coating with 21.5% Fe is obtained.

| Example 4 | | |
|---|---|---|
| Zinc sulphate ($ZnSO_4 \cdot 7H_2O$) | 50 g/L | 0.0174M |
| Ferrous sulphate ($FeSO_4 \cdot 7H_2O$) | 50 g/L | 0.18M |
| Boric acid ($H_3BO_3$) | 50 g/L | 0.95 |
| Sodium Sulphate ($Na_2SO_4 \cdot 10H_2O$) | 50 g/L | 0.19 |

Overall, the present disclosure provides improved electrolyte solutions for electrodeposition of zinc-iron alloys, methods of forming zinc-iron alloys, and methods of electrodepositing zinc-iron alloys.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A method for electrodepositing a zinc-iron alloy on a substrate, the method comprising:

introducing a cathode and an anode into an electrolyte solution comprising a zinc salt, an iron salt, an alkali metal citrate, an alkali metal acetate, a citric acid, and glycine, the electrolyte solution having a glycine concentration from about 0.1 moles per liter (mol/L) to about 2 mol/L and an alkali metal citrate concentration from about 0.001 mol/L to about 0.1 mol/L; and passing a first current between the cathode and the anode through the electrolyte solution to deposit a first layer containing zinc and iron onto the cathode, the first current having a first current density from about 1 $mA/cm^2$ to about 500 $mA/cm^2$.

2. The method of claim 1, wherein the electrolyte solution further comprises thiamine hydrochloride.

3. The method of claim 2, wherein the electrolyte solution comprises a concentration of the thiamine hydrochloride from about 0.0001 moles per liter (mol/L) to about 1 mol/L.

4. The method of claim 3, wherein a concentration of the thiamine hydrochloride in the electrolyte solution is about 0.0015 mol/L.

5. The method of claim 1, wherein the cathode is a steel substrate, a copper substrate, a brass substrate, a nickel substrate, a copper-coated substrate, or a nickel-coated substrate.

6. The method of claim 1, wherein the anode is a zinc material, platinum material, platinized titanium material, or a carbonaceous electrode material.

7. The method of claim 1, wherein the first current has a first current density from about 5 $mA/cm^2$ to about 200 $mA/cm^2$.

8. The method of claim 7, wherein the first current includes a pulsed current formed from a series of pulses and each pulse has a duration of from about 20 milliseconds to about 800 milliseconds.

9. The method of claim 8, wherein a temperature of the electrolyte solution is maintained at a temperature from about 20° C. to about 35° C. while passing the first current.

10. The method of claim 1, further comprising passing a second current between the cathode and the anode to deposit a second layer comprising zinc and iron onto the first layer, the second current having a second current density from about 5 $mA/cm^2$ to about 500 $mA/cm^2$, the second current density being different than the first current density.

11. The method of claim 10, further comprising repeating passing the first current and the second current between the cathode and the anode to form a coating having a plurality of alternating layers, wherein the plurality of alternating layers have substantially the same thickness and two or more of the layers have a different iron content.

12. The method of claim 10, further comprising repeating passing the first current and the second current between the cathode and the anode to form a coating having a plurality of alternating layers, wherein two or more of the plurality of alternating layers have a different thickness and two or more of the plurality of alternating layers have a different iron content.

13. The method of claim 10, further comprising repeating passing the first current and the second current between the cathode and the anode to form a coating having a plurality of alternating layers comprising:

the first layer having a first iron content, the second layer having a second iron content different than the first iron content, a third layer having the same iron content as the first layer, and a fourth layer having the same iron content as the second layer.

14. The method of claim 10, further comprising repeating passing the first current and the second current between the cathode and the anode to form a coating having a plurality of alternating layers, wherein each layer has substantially the same thickness and each layer has a different iron content.

15. The method of claim 10, further comprising repeating passing the first current and the second current between the cathode and the anode to form a coating having a plurality of alternating layers, wherein each layer has a different thickness and each layer has a different iron content.

16. The method of claim 1, further comprising passing a second current between the cathode and the anode having the same current density as the first current density of the first current to deposit a second layer comprising zinc and iron onto the first layer deposited by the first current.

17. The method of claim 16, further comprising repeating passing the first current and the second current between the cathode and the anode to form a coating having a plurality of alternating layers having an iron content, wherein each of the first current and the second current substantially the same duration and the plurality of alternating layers have substantially the same thickness and substantially the same iron content.

18. The method of claim 1, wherein first layer comprises an iron content from about 8.9 wt. % to about 62.4 wt. %.

19. The method of claim 1, wherein a concentration of the alkali metal citrate in the electrolyte solution is about 0.018 mol/L.

20. The method of claim 1, wherein a concentration of the glycine in the electrolyte solution is about 0.146 mol/L.

21. A method for electrodepositing a zinc-iron alloy on a substrate, the method comprising:

introducing a cathode and an anode into an electrolyte solution comprising a zinc salt, an iron salt, an alkali metal citrate, an alkali metal acetate, a citric acid, thiamine hydrochloride, and glycine, the electrolyte solution having a thiamine hydrochloride concentration from about 0.0001 moles per liter (mol/L) to about 1 mol/L an alkali metal citrate concentration from about 0.001 mol/L to about 0.1 mol/L, have been inserted after the concentration "1 mol/L", and a glycine concentration from about 0.1 mol/L to about 2 mol/L;

passing a first current having a first current density between the cathode and the anode through the electrolyte solution to deposit a first layer containing zinc and iron onto the cathode to form a zinc-iron alloy on a substrate, the first layer comprising an iron content from about 8.9 wt. % to about 62.4 wt. %; and passing a second current between the cathode and the anode to deposit a second layer comprising zinc and iron onto the first layer, the second current having a second current density, wherein each of the first current density and the second current density is from about 1 $mA/cm^2$ to about 500 $mA/cm^2$, the first current density being different than the second current density.

22. The method of claim 21, wherein a concentration of the thiamine hydrochloride in the electrolyte solution is about 0.0015 mol/L.

23. The method of claim 21, wherein a concentration of the glycine in the electrolyte solution is about 0.146 mol/L.

24. A method for electrodepositing a zinc-iron alloy on a substrate, the method comprising:

introducing a cathode and an anode into an electrolyte solution comprising a zinc salt, an iron salt, an alkali metal citrate, an alkali metal acetate, a citric acid, and glycine, the electrolyte solution having a glycine concentration from about 0.1 mol/L to about 2 mol/L and an alkali metal citrate concentration from about 0.001 mol/L to about 0.1 mol/L have been inserted after the concentration "mol/L";

passing a first current having a first current density between the cathode and the anode through the electrolyte solution to deposit a first layer containing zinc and iron onto the cathode to form a zinc-iron alloy on a substrate, passing a second current between the cathode and the anode to deposit a second layer comprising zinc and iron onto the first layer, each of the first current and the second current having a second current density from about 1 $mA/cm^2$ to about 500 $mA/cm^2$, the first current density being less than the second current density; and repeating passing the first current and the second current between the cathode and the anode to form a coating having a plurality of alternating layers including the first layer and the second layer, the first layer comprising a first iron content from about 8.9 wt. % to about 62.4 wt. %, wherein the first iron content is less than a second iron content of the second layer.

25. The method of claim 24, wherein a concentration of the glycine in the electrolyte solution is about 0.146 mol/L.

26. The method of claim 24, wherein the electrolyte solution further comprises thiamine hydrochloride.

27. The method of claim 26, wherein the electrolyte solution comprises a concentration of the thiamine hydrochloride is from about 0.0001 moles per liter (mol/L) to about 1 mol/L.

28. The method of claim 24, wherein a thickness of the first layer is from about 0.1 microns to about 5 microns.

29. The method of claim 24, wherein a thickness of the coating is from about 1 micron to about 100 microns.

* * * * *

UNITED STATES PATENT AND TRADEMARK OFFICE

CERTIFICATE OF CORRECTION

PATENT NO. : 10,767,274 B2
APPLICATION NO. : 15/680326
DATED : September 8, 2020
INVENTOR(S) : Stephen P. Gaydos et al.

It is certified that error appears in the above-identified patent and that said Letters Patent is hereby corrected as shown below:

In the Claims

In Column 16, Line 27, in Claim 17, after "current" insert -- have --.

In Column 16, Line 46, in Claim 21, after "mol/L" insert -- , --.

In Column 16, Lines 47-48, in Claim 21, after "0.1 mol/L," delete "have been inserted after the concentration "1 mol/L",".

In Column 17, Lines 9-10, in Claim 24, delete "mol/L have been inserted after the concentration "mol/L";" and insert -- mol/L; --, therefor.

Signed and Sealed this
Twenty-third Day of February, 2021

Drew Hirshfeld
*Performing the Functions and Duties of the Under Secretary of Commerce for Intellectual Property and Director of the United States Patent and Trademark Office*